Nov. 10, 1931.  G. M. BACON  1,831,405
MOTOR DRIVEN DELIVERY VEHICLE
Filed Jan. 14, 1924   2 Sheets-Sheet 1
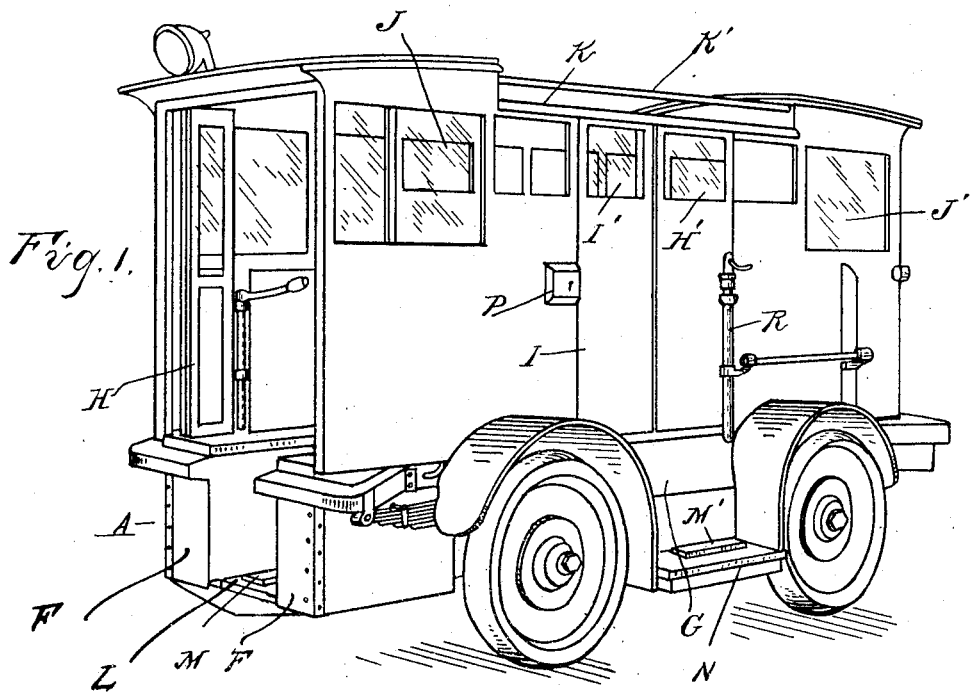
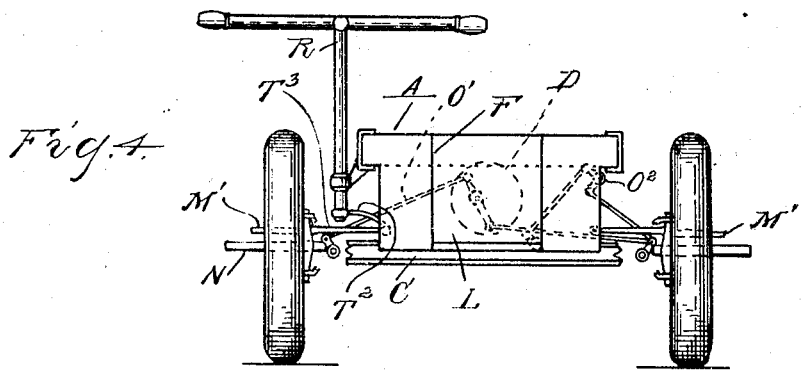
Inventor
George M. Bacon
Attorneys Nov. 10, 1931.  G. M. BACON  1,831,405
MOTOR DRIVEN DELIVERY VEHICLE
Filed Jan. 14, 1924  2 Sheets-Sheet 2

Inventor
George M. Bacon

Attorneys

Patented Nov. 10, 1931

1,831,405

UNITED STATES PATENT OFFICE

GEORGE M. BACON, OF DETROIT, MICHIGAN, ASSIGNOR TO DIVCO-DETROIT CORPORATION, OF DETROIT, MICHIGAN, A CORPORATION OF MICHIGAN

MOTOR DRIVEN DELIVERY VEHICLE

Application filed January 14, 1924. Serial No. 686,164.

The invention relates to motor vehicles and has for its object the obtaining of a construction particularly adapted for house to house deliveries. For instance, in the delivery of milk, horse drawn vehicles have been generally preferred, on the theory that they are easier to control while speed is not required. On the other hand, there are many objections to the use of the horse, which would be eliminated by the substitution of a motor vehicle.

It is the object of the invention to obtain a construction of motor vehicle which may be more easily operated and controlled than the horse drawn vehicle and which possesses various other advantages, as hereinafter set forth.

In the drawings:

Figure 1 is a perspective view of the vehicle;

Figure 4 is an end elevation.

Figure 2:
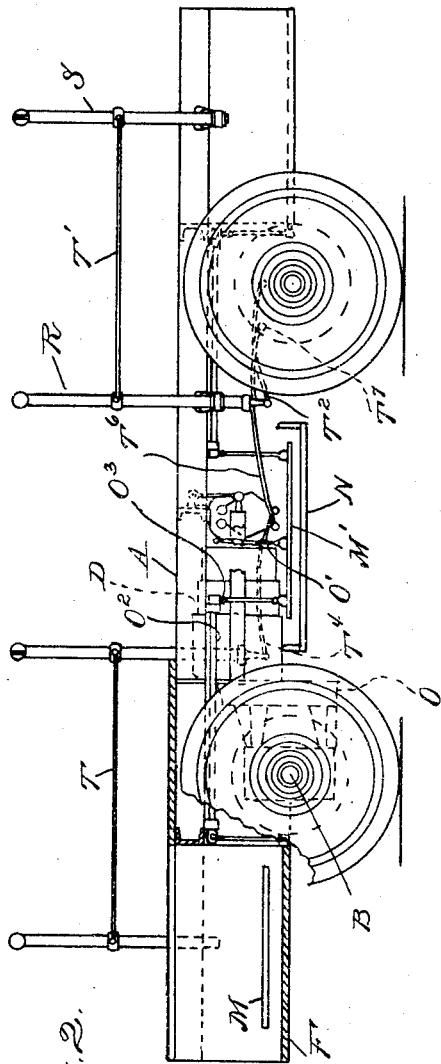
Figure 2 is a side elevation of the chassis with the body removed.
Figure 3:
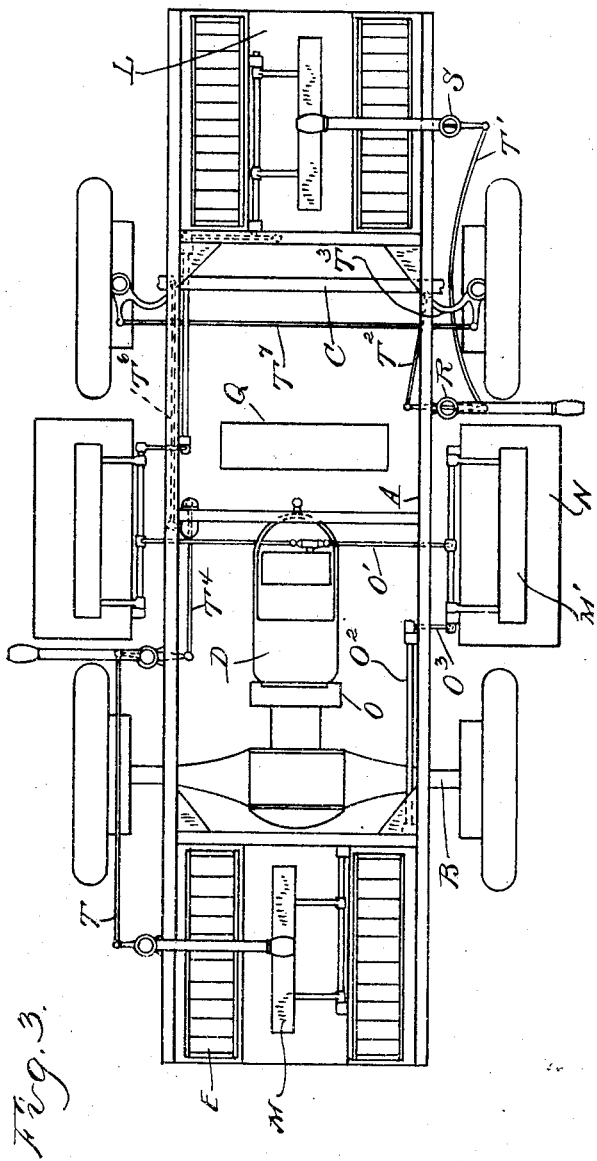
Figure 3 is a plan view thereof.

The construction shown and which will be specifically described is designed for milk delivery, but it is obvious that my improvements are applicable to various constructions of delivery vehicles. As shown, A is the chassis frame supported upon the axles B and C and provided with a motor D shown as an electric motor. This is directly connected to the rear axle B extending forwardly therefrom at the center of the frame, while the storage batteries E are arranged upon opposite sides and at opposite ends of the frame in depending receptacles F. Thus a well balanced construction is obtained, while the center of each end of the frame is unobstructed, permitting ready access to the load as hereinafter described. G is the body which is designed with door openings at opposite ends and also at the center of each side. Intermediate these door openings are load receiving spaces, while at the top of both sides and ends there are glass panels permitting the operator to look through in any direction and from any point within or without the car. More in detail, the end openings are provided with hinged double doors H for closing the same and the side openings are closed by doors I. These doors have the glass panels H' and I' in the upper portions thereof, while the stationary sides of the body have the glass panels J and J'. These glass panels at the ends of the body are of greater depth than in the center portion, as the load located in this portion would obstruct the driver's view. At the top the body is provided with a deck K for also receiving load, such as empty containers, and rails K' are provided to hold this load from falling off.

As has been stated, the control of the vehicle is from various points, preferably from opposite ends and from opposite sides. Thus, as shown, there is arranged at each end in the space between the battery receptacles F a compartment having a floor L secured to portions of the depending receptacles F at the bottom of said receptacles in which is arranged a pedal brake M, preferably applied when the pedal is released. This permits the operator to stand upon the brake to release the same while operating the car and to always have the brakes applied when he leaves the car. Similar brake controlling pedals M' are arranged upon the running boards N on opposite sides of the car and all of these pedals are connected to common brake actuating mechanism. This comprises any suitable brake, such as a transmission brake O, which is connected by linkage not shown and rods O' to the pedals M' upon opposite running boards. The end pedals M are connected to the side pedals by a suitable linkage comprising the rock shafts $O^2$ extending longitudinally at opposite sides of the frame and the links $O^3$ for connecting said rock shafts to the side and end pedals.

The motor control is also from each end and each running board and where, as shown, an electric motor is used, controlling switches P are arranged at each of said points. These switches may be of any suitable construction, being preferably operated by a removable handle, which the operator carries with him to prevent tampering with the car while he is absent. The switches P are connected by suitable conductors not shown to a box Q in which there are arranged suitable devices for controlling both the speed and the reversing of the motor. The whole arrangement is such that the movement of the controlling handle in one direction will drive the car in this direction and at varying speeds, according to the degree of movement, while the movement in the opposite direction will similarly control the movement of the car in that direction.

The steering of the vehicle is likewise controlled from each of the several points and as shown, the arrangement comprises steering posts R on opposite sides controlled from the running boards and steering posts S at opposite ends controlled from the inside of the body. Each post is provided with a suitable handle that preferably folds and all of the posts are connected together through a suitable linkage. This as shown comprises the rods T and T' for connecting the end posts to the side posts, the link T² for connecting one of the side posts with the actuating arm T³ of the steering knuckle at one side of the car and a reversing connection between the side posts and the actuating arm of the steering knuckle on the opposite side of the car. Such reversing mechanism is necessary in order that a similar movement of the steering lever on opposite sides and at opposite ends of the car will produce a similar steering movement of the vehicle. Thus as shown the side post is connected by a link T⁴ with the reversing gear (not shown in detail) and the latter by a link T⁵ to the steering knuckle, while the usual cross rod T⁷ couples the steering knuckles for the wheels on opposite sides of the car.

A vehicle constructed as described can be driven with equal facility either forward or rearward from either end or either side of the car. Thus the operator may leave the car from one end and return to the opposite end or to either side and from each of these points he also has access to the load. If this consists of milk in bottles, which are held in crates or boxes, as soon as one box is empty it may be placed upon the top deck so as not to obstruct access to the lower boxes. Another difficulty which is avoided by the construction is that of turning the vehicle, or the necessity of turning when passing from one side to the other of the street. In many cities the traffic regulation prevents the parking of a car at the side of the street when facing in the wrong direction, but with a double-ended car or one controlled from each end, such a regulation is unnecessary.

What I claim as my invention is:

1. A motor vehicle comprising a chassis frame provided with a central floor portion flush with the top of said frame and depending floor supporting portions at opposite ends thereof, a body mounted on said frame providing operating compartments above said depending floor portions controlling mechanism alternatively operable from said compartments for controlling the speed and direction of movement of the vehicle, and a storage compartment above said central floor portion, the upper portion of said body having transparent panels to provide clear vision in all directions from either of said operating compartments.

2. In a motor vehicle, a chassis frame having a central floor portion flush with the top of said frame and depending floor supporting portions at opposite ends thereof, and a body mounted on said frame providing operating compartments above said depending floor portions, controlling mechanisms in said operating compartments for alternatively operating said vehicle in reverse directions from either compartment and means affording the operator a clear vision in all directions from said compartments.

3. In a motor vehicle, a chassis frame provided with a central floor portion flush with the top thereof and depending floor supporting portions at opposite ends and running boards at opposite sides, a body mounted on said frame providing operating compartments at opposite ends above said depending floor portions, alternatively operable controlling mechanism for the vehicle in each of said compartments and adjacent to each of said running boards and means affording the operator a clear vision in all directions from said compartments and running boards.

4. A motor vehicle comprising a chassis frame having a central floor portion flush with the top thereof, depending floor supporting portions at opposite ends and running boards at opposite sides, a body mounted on said frame provided with doors at opposite ends and upon opposite sides, the portion of said body above said central floor forming a storage compartment and the end portions forming operating compartments, the upper portion of said body and doors having transparent panels to provide clear vision in all directions, and alternatively operable controlling mechanisms for the vehicle located in each of said compartments and adjacent to each of said running boards.

5. In a motor vehicle, a chassis frame provided with a floor portion flush with the top thereof and a depending floor supporting portion at one end and running boards at opposite sides, a body mounted on said frame providing an operating compartment above said depending floor portion, alternately operable controlling mechanism for the vehicle in said compartment and adjacent each running board, and means affording the operator a clear vision from said compartment and running boards.

6. A motor vehicle having in combination, a frame, running boards supported by the frame and extending longitudinally of the vehicle, and control mechanism alternatively operable from either of the running boards and from opposite ends of the frame.

7. A motor vehicle having in combination, a frame, running boards extending longitudinally of the vehicle upon opposite sides of the frame, control mechanism alternatively operable from either of said running boards, and a closed body carried by said frame extending forwardly and rearwardly of said running boards and having an operating compartment affording a clear vision in all directions from the running boards.

8. In a motor vehicle, the combination of a chassis having front and rear wheels, low level operating platforms arranged on opposite sides of said chassis between the front and rear wheels, separate brake control means operable alternatively from each of said oppositely disposed platforms, and separate acceleration control means operable alternatively from each of said oppositely disposed platforms.

9. In a motor vehicle, the combination of a chassis having front and rear wheels, low level operating platforms arranged on opposite sides of said chassis between the front and rear wheels, separate brake control means operable alternatively from each of said oppositely disposed platforms, separate acceleration control means operable alternatively from each of said oppositely disposed platforms, and separate steering control means alternatively operable from each of said platforms.

10. In a motor vehicle, the combination of a chassis having front and rear wheels, low level operating platforms arranged on opposite sides of said chassis between the front and rear wheels, and an operating platform at one end of said vehicle, and separate control means for said vehicle operable from each of the three platforms aforesaid.

11. In a motor vehicle, the combination of a chassis having front and rear wheels, low level operating platforms on opposite sides of said chassis between said front and rear wheels, and an operating platform at one end of the vehicle forward of the said front wheels and separate control devices operable from each of said platforms.

12. In a motor vehicle, the combination of a chassis having front and rear wheels, low level operating platforms on opposite sides of said chassis between the front and rear wheels thereof, low level operating platforms at each end of the vehicle beyond the front and rear wheels respectively, and separate control means for the vehicle operable from each of said platforms.

13. In a motor vehicle, the combination of a chassis having front and rear wheels, a low level operating platform intermediate the front and rear wheels, a closed body on said chassis extending longitudinally beyond the front and rear wheels respectively, the upper part of said body having transparent panels extending substantially around the entire body and affording clear vision in all directions from said low level operating platform, and control means for said vehicle operable from said platform.

14. In a motor vehicle, the combination of a chassis frame having front and rear wheels, depending operating platforms on opposite sides of said vehicle between the front and rear wheels, a closed body mounted on said chassis frame and extending forwardly and rearwardly of said platforms, and separate brake control means on each of said platforms.

In testimony whereof I affix my signature.
GEO. M. BACON.